US010298913B2

(12) United States Patent
Shpunt et al.

(10) Patent No.: US 10,298,913 B2
(45) Date of Patent: May 21, 2019

(54) STANDALONE DEPTH CAMERA

(71) Applicant: APPLE INC., Cupertino, CA (US)

(72) Inventors: Alexander Shpunt, Portola Valley, CA (US); Yuval Gerson, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 77 days.

(21) Appl. No.: 15/586,295

(22) Filed: May 4, 2017

(65) Prior Publication Data
US 2018/0054610 A1 Feb. 22, 2018

Related U.S. Application Data

(60) Provisional application No. 62/376,407, filed on Aug. 18, 2016, provisional application No. 62/467,146, filed on Mar. 5, 2017.

(51) Int. Cl.
*H04N 5/33* (2006.01)
*F16M 11/08* (2006.01)
(Continued)

(52) U.S. Cl.
CPC ........... *H04N 13/271* (2018.05); *F16M 11/08* (2013.01); *F16M 11/18* (2013.01); *F16M 11/22* (2013.01);
(Continued)

(58) Field of Classification Search
CPC ............. H04N 13/271; H04N 5/23238; H04N 2213/001; H04N 13/296; H04N 13/254;
(Continued)

(56) References Cited

U.S. PATENT DOCUMENTS 5,225,876 A 7/1993 Lux et al.
5,258,822 A 11/1993 Nakamura
(Continued)

FOREIGN PATENT DOCUMENTS

EP 0603003 A1 6/1994
EP 1903304 A2 3/2008
(Continued)

OTHER PUBLICATIONS

Sick AG, "MiniFaros: Low-cost Miniature Laserscanner for Environment Perception", Presentation at 15th International Forum on Advanced Microsystems for Automotive Applications (AMAA 2011), 17 pages, Berlin, Germany, 2011.
(Continued)

*Primary Examiner* — Christopher S Kelley
*Assistant Examiner* — Nasim N Nirjhar
(74) *Attorney, Agent, or Firm* — Kligler & Associates (57) ABSTRACT

Scanning apparatus includes a base and a gimbal, including a shaft that fits into rotational bearings in the base and is configured to rotate through 360° about a gimbal axis relative to the base. A mirror assembly, fixed to the gimbal, includes a mirror, which is positioned on the gimbal axis and is configured to rotate about a mirror axis perpendicular to the gimbal axis. A transmitter directs pulses of optical radiation toward the mirror, which directs the optical radiation toward a scene. A receiver, receives, via the mirror, the optical radiation reflected from the scene and outputs signals in response to the received radiation. Control circuitry drives the gimbal to rotate about the gimbal axis and the mirror to rotate about the mirror axis, and processes the signals output by the receiver in order to generate a three-dimensional map of the scanned area.

14 Claims, 4 Drawing Sheets

(51) Int. Cl.

| | | |
|---|---|---|
| *F16M 11/18* | (2006.01) | |
| *F16M 11/22* | (2006.01) | |
| *G01C 15/00* | (2006.01) | |
| *G01S 17/10* | (2006.01) | |
| *G01S 17/42* | (2006.01) | |
| *G01S 17/89* | (2006.01) | |
| *G01S 3/789* | (2006.01) | |
| *G01S 7/481* | (2006.01) | |
| *G02B 26/08* | (2006.01) | |
| *G02B 26/10* | (2006.01) | |
| *G03B 37/02* | (2006.01) | |
| *H04N 5/232* | (2006.01) | |
| *H04N 13/254* | (2018.01) | |
| *H04N 13/271* | (2018.01) | |
| *H04N 13/296* | (2018.01) | |

(52) U.S. Cl.
CPC .......... *G01C 15/002* (2013.01); *G01S 3/789* (2013.01); *G01S 7/4812* (2013.01); *G01S 7/4817* (2013.01); *G01S 17/10* (2013.01); *G01S 17/42* (2013.01); *G01S 17/89* (2013.01); *G02B 26/0816* (2013.01); *G02B 26/105* (2013.01); *G03B 37/02* (2013.01); *H04N 5/23238* (2013.01); *H04N 5/332* (2013.01); *H04N 13/254* (2018.05); *H04N 13/296* (2018.05); *F16M 2200/08* (2013.01); *H04N 2213/001* (2013.01)

(58) Field of Classification Search
CPC ..... H04N 5/332; G01S 7/4812; G01S 7/4817; G01S 17/89; G01S 17/42; G01S 3/789; G03B 37/02; G02B 26/0816; G02B 26/105; G01C 15/002; F16M 11/18; F16M 11/22; F16M 2200/08; F16M 11/08
See application file for complete search history.

(56) References Cited

U.S. PATENT DOCUMENTS

| | | | |
|---|---|---|---|
| 7,248,344 | B2 | 7/2007 | Morcom |
| 7,952,781 | B2 | 5/2011 | Weiss et al. |
| 8,018,579 | B1 | 9/2011 | Krah |
| 8,353,457 | B2 | 1/2013 | Olmstead |
| 8,508,676 | B2 | 8/2013 | Silverstein et al. |
| 9,098,931 | B2 | 8/2015 | Shpunt et al. |
| 9,267,787 | B2 | 2/2016 | Shpunt et al. |
| 2002/0071169 | A1 | 6/2002 | Bowers et al. |
| 2003/0090646 | A1 | 5/2003 | Riegl et al. |
| 2003/0090818 | A1 | 5/2003 | Wittenberger |
| 2003/0227614 | A1 | 12/2003 | Taminiau et al. |
| 2005/0024701 | A1 | 2/2005 | Cannon et al. |
| 2005/0110157 | A1 | 5/2005 | Sherrer et al. |
| 2007/0221826 | A1 | 9/2007 | Bechtel et al. |
| 2007/0279722 | A1 | 12/2007 | Yavid et al. |
| 2008/0075325 | A1* | 3/2008 | Otani .................. G01C 15/002 382/106 |
| 2008/0278566 | A1 | 11/2008 | Towner et al. |
| 2009/0141192 | A1 | 6/2009 | Nojima |
| 2010/0053595 | A1 | 3/2010 | Lee |
| 2010/0142020 | A1 | 6/2010 | Kim |
| 2011/0019176 | A1* | 1/2011 | Kim .......... G01C 3/08 356/5.01 |
| 2011/0188054 | A1 | 8/2011 | Petronius et al. |
| 2011/0228251 | A1 | 9/2011 | Yee et al. |
| 2011/0254928 | A1 | 10/2011 | Meinherz |
| 2011/0279648 | A1 | 11/2011 | Lutian et al. |
| 2011/0310125 | A1 | 12/2011 | McEldowney et al. |
| 2012/0074296 | A1 | 3/2012 | Hammes et al. |
| 2012/0182392 | A1 | 7/2012 | Kearns et al. |
| 2012/0236379 | A1 | 9/2012 | Da Silva et al. |
| 2013/0207970 | A1 | 8/2013 | Shpunt et al. |
| 2013/0250387 | A1 | 9/2013 | Chayat et al. |
| 2014/0168633 | A1 | 6/2014 | Guetta et al. |
| 2014/0225824 | A1 | 8/2014 | Shpunt et al. |
| 2014/0291496 | A1 | 10/2014 | Shpunt et al. |
| 2014/0320944 | A1* | 10/2014 | Lubianiker ........ G02B 26/0841 359/199.3 |
| 2015/0120057 | A1 | 4/2015 | Wong et al. |
| 2015/0198801 | A1* | 7/2015 | Naono ................ H01L 41/0953 359/199.4 |
| 2015/0260506 | A1* | 9/2015 | Bridges ................ G01B 21/045 356/3.09 |
| 2016/0282468 | A1* | 9/2016 | Gruver .................... G01S 17/93 |
| 2017/0176596 | A1 | 6/2017 | Shpunt et al. |

FOREIGN PATENT DOCUMENTS

| | | |
|---|---|---|
| JP | H07198845 A | 8/1995 |
| KR | 1020120091810 A | 8/2012 |
| WO | 8702148 A1 | 4/1987 |
| WO | 9816801 A1 | 4/1998 |
| WO | 0020825 A1 | 4/2000 |
| WO | 02/082016 A1 | 10/2002 |
| WO | 2004036245 A2 | 4/2004 |
| WO | 2012150590 A1 | 11/2012 |

OTHER PUBLICATIONS

International Application # PCT/US2017/021018 Search Report dated Jun. 12, 2017.

International Application # PCT/US2017/039162 Search Report dated Nov. 27, 2017.

* cited by examiner

STANDALONE DEPTH CAMERA

CROSS-REFERENCE TO RELATED APPLICATION

This application claims the benefit of U.S. Provisional Patent Application 62/376,407, filed Aug. 18, 2016, and of U.S. Provisional Patent Application 62/467,146, filed Mar. 5, 2017, both of which are incorporated herein by reference.

FIELD OF THE INVENTION

The present invention relates generally to three-dimensional (3D) mapping, and particularly to devices and methods for 3D mapping based on projection and sensing of a pulsed beam of radiation.

BACKGROUND

Various methods are known in the art for optical 3D mapping, i.e., generating a 3D profile of the surface of an object by processing optical radiation received from the object. This sort of 3D profile is also referred to as a 3D map, depth map or depth image, and 3D mapping is also referred to as depth mapping. "Optical radiation" includes any and all electromagnetic radiation in the visible, infrared and ultraviolet portions of the spectrum.

Some 3D mapping techniques are based on measurement of the time of flight of optical pulses. For example, U.S. Patent Application Publication 2013/0207970, whose disclosure is incorporated herein by reference, describes a scanning depth engine, in which mapping apparatus includes a transmitter, which emits a beam comprising pulses of light, and a scanner, which is configured to scan the beam, within a predefined scan range, over a scene. A receiver receives the light reflected from the scene and generates an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

In some cases, the same scanner can be used for both 3D mapping and projection of visible light. For example, U.S. Pat. No. 9,098,931, whose disclosure is incorporated herein by reference, describes apparatus for mapping that includes an illumination module, which includes a radiation source, which is configured to emit a beam of radiation. A scanner receives and scans the beam over a selected angular range. Illumination optics project the scanned beam so as to create a pattern of spots extending over a region of interest. An imaging module captures an image of the pattern that is projected onto an object in the region of interest. A processor processes the image in order to construct a three-dimensional map of the object.

In one of the embodiments described in U.S. Pat. No. 9,098,931, the radiation source includes a first radiation source, which emits an infrared beam, which is modulated to create the pattern of the spots, and a second radiation source, which emits a visible light beam, which is modulated to project a visible image onto the region of interest. The scanner and optics are configured to project both the infrared beam and the visible light beam onto the region of interest simultaneously. Typically, the second radiation source is controlled so as to project the visible image onto the object responsively to the 3D map.

SUMMARY

Embodiments of the present invention that are described hereinbelow provide improved devices and methods for 3D mapping. Some of these devices are also capable of projecting visible images over the volume that is mapped by the device.

There is therefore provided, in accordance with an embodiment of the invention, scanning apparatus, including a base containing one or more rotational bearings disposed along a gimbal axis, and a gimbal, including a shaft that fits into the rotational bearings and is configured to rotate through 360° of azimuth about the gimbal axis relative to the base. A mirror assembly is fixed to the gimbal and includes a mirror, which is positioned on the gimbal axis and is configured to rotate within the mirror assembly about a mirror axis perpendicular to the gimbal axis. A transmitter is configured to direct pulses of optical radiation toward the mirror, which directs the optical radiation toward a scene. A receiver is positioned to receive, via the mirror, the optical radiation reflected from the scene and to output signals in response to the received radiation. Control circuitry is configured to drive the gimbal to rotate about the gimbal axis and the mirror to rotate about the mirror axis so as to scan the optical radiation over an area of the scene extending over the 360° of azimuth about the gimbal axis, and to process the signals output by the receiver in order to generate a three-dimensional map of the scanned area.

In some embodiments, the apparatus includes a beamsplitter, which is positioned along the gimbal axis between the transmitter and the receiver and is configured so that the optical radiation is directed from the transmitter, via the beamsplitter, along the gimbal axis toward the mirror, while the optical radiation reflected from the scene is directed, via the beamsplitter, along the gimbal axis toward the receiver.

In one embodiment, the pulses of the optical radiation include infrared radiation, and the apparatus includes an emitter, which is configured to direct a visible light beam toward the mirror, wherein the visible light beam is modulated so as to project a visible image via the mirror onto the scene.

In a disclosed embodiment the base is configured for placement on a flat surface, with the gimbal axis perpendicular to the flat surface, while the gimbal, the mirror assembly, the transmitter and the receiver are contained inside the base, and the base includes a cylindrical window, surrounding the mirror assembly, through which the optical radiation exits and enters the base.

In some embodiments, the base includes a pedestal, which engages the flat surface, and a cap, with the cylindrical window fixed between the pedestal and the cap, and the rotational bearings are fixed within the cap. In other embodiments, the rotational bearings are fixed within the pedestal, and the apparatus includes a retroreflector, which is mounted in the cap so as to reflect the pulses of optical radiation from the transmitter toward the mirror, and to reflect the optical radiation reflected from the scene via the mirror toward the receiver.

In some embodiments, the control circuitry includes a drive, which is coupled to the mirror assembly and the gimbal so as to cause the mirror to rotate about the mirror axis at a first frequency, while causing the gimbal to rotate about the gimbal axis at a second frequency, which is lower than the first frequency. In a disclosed embodiment, the mirror assembly includes a support, which is fixed to the gimbal, and hinges, extending between the mirror and support, wherein the first frequency is a resonant frequency of rotation of the mirror about the hinges.

Additionally or alternatively, the drive is an electromagnetic drive, which includes a stator, which is fixed to the gimbal and includes a core positioned in proximity to the mirror and conductive wire wound on the core and driven with an electrical current by the control circuitry so as to cause the core to generate a magnetic field at the mirror. A rotor includes one or more permanent magnets, which are fixed to the mirror are positioned so as to rotate in response to the magnetic field. In one embodiment, the stator includes at least a part of the shaft of the gimbal.

In a disclosed embodiment, the signals output by the receiver are indicative of respective times of flights of the pulses, and the control circuitry is configured to generate the three-dimension map based on the times of flight.

There is also provided, in accordance with an embodiment of the invention, a method for scanning, which includes providing a base containing one or more rotational bearings disposed along a gimbal axis. A shaft of a gimbal is fitted into the rotational bearings so that the gimbal is able to rotate through 360° of azimuth about the gimbal axis relative to the base. A mirror assembly, including a mirror, is fixed to the gimbal so that the mirror is positioned on the gimbal axis and is configured to rotate within the mirror assembly about a mirror axis perpendicular to the gimbal axis. Pulses of optical radiation are directed from a transmitter toward the mirror, which directs the optical radiation toward a scene. The optical radiation reflected from the scene is received, via the mirror, in a receiver, which outputs signals in response to the received radiation. The gimbal is driven to rotate about the gimbal axis and the mirror is driven to rotate about the mirror axis so as to scan the optical radiation over an area of the scene extending over the 360° of azimuth about the gimbal axis. The signals output by the receiver are processed in order to generate a three-dimensional map of the scanned area.

The present invention will be more fully understood from the following detailed description of the embodiments thereof, taken together with the drawings in which:

DETAILED DESCRIPTION OF EMBODIMENTS

Depth mapping devices that are known in the art are generally limited to scanning and mapping a certain limited angular sector. In some applications, however, it is desirable to be able to map an area of a scene extending over a full 360° of azimuth (and a certain range of elevations), and to be able to update the map continuously without user intervention.

Embodiments of the present invention that are described herein provide mapping apparatus that is capable of this sort of standalone 360° operation. In some embodiments, the apparatus comprises a self-contained unit with a flat base, which can be placed on a tabletop, for example, in order to map a room and its occupants. Additionally or alternatively, the same apparatus can be used to scan a modulated beam of visible light so as to project a visible image onto the scene that is mapped.

Figure 1:
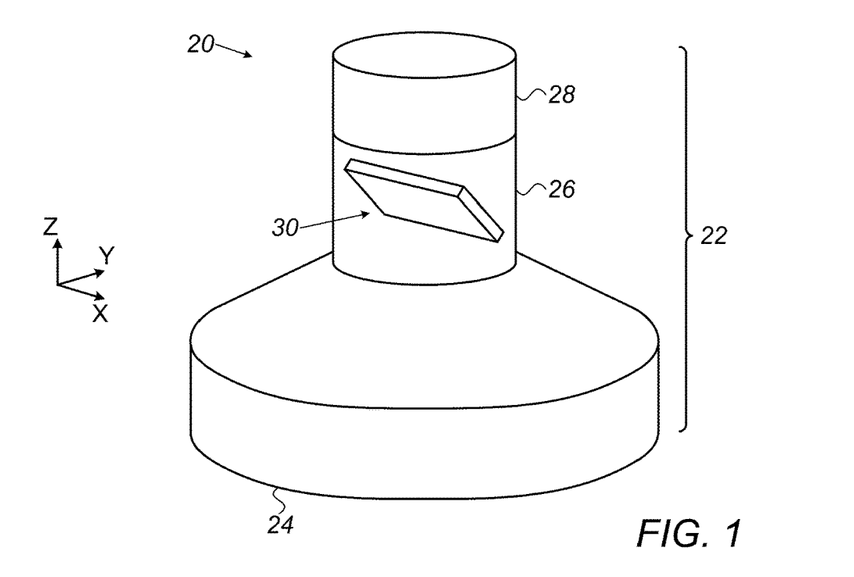
FIG. 1 is a schematic pictorial illustration of a 3D mapping and projection device, in accordance with an embodiment of the invention.

FIG. 1 is a schematic pictorial illustration of a 3D mapping and projection device 20, in accordance with an embodiment of the invention. The device comprises a base 22, which comprises, in the pictured embodiment, a pedestal 24 configured for placement on a flat surface. The surface may be a horizontal surface, such as a tabletop, on which the base can rest without further fixation or support, or it may alternatively be a ceiling or wall, for example, to which the base is fixed. The pictured device is compact, for example with a diameter of 26 mm and a height of 20 mm. It typically communicates via a wired or wireless connection with a host computer (not shown), in order to transmit mapping results and, optionally, to receive projection instructions.

As shown in FIG. 1, base 22 of mapping and projection device 20 comprises a cylindrical window 26 through which optical radiation exits and enters the base via a scanning module 30, with a cap 28 closing the base above cylindrical window 26, so that the cylindrical window is fixed between pedestal 24 and cap 28. The other elements of the device, as shown in the figures that follow, can all be contained inside base 22. In this and the subsequent figures, the bottom of the base is taken to define the X-Y plane, with the Z-axis extending perpendicular thereto.

Figure 2A:
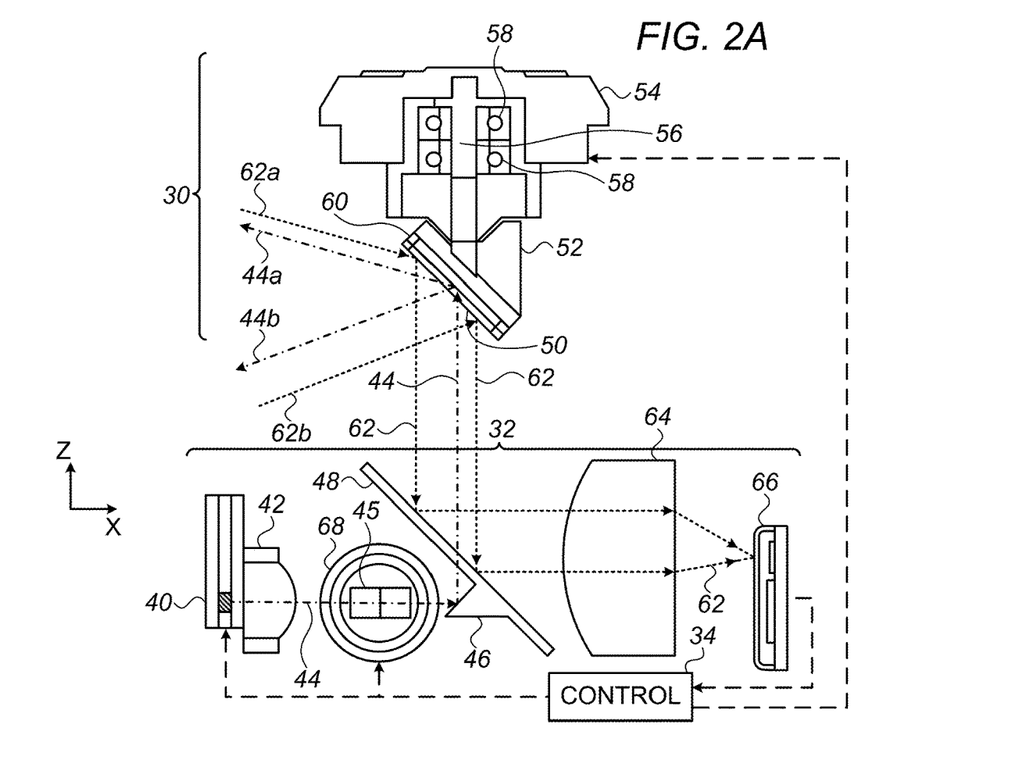
FIGS. 2A and 2B are schematic sectional and pictorial views, respectively, of an optoelectronic assembly used in the device of FIG. 1, in accordance with an embodiment of the invention.
Figure 2B:
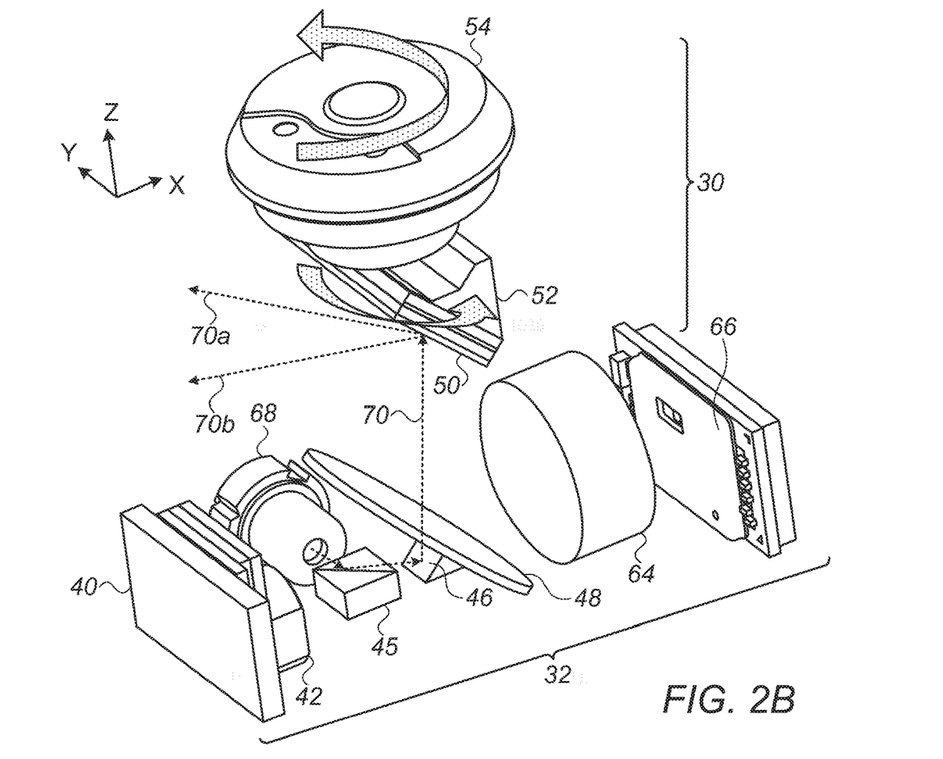
Figure 3:
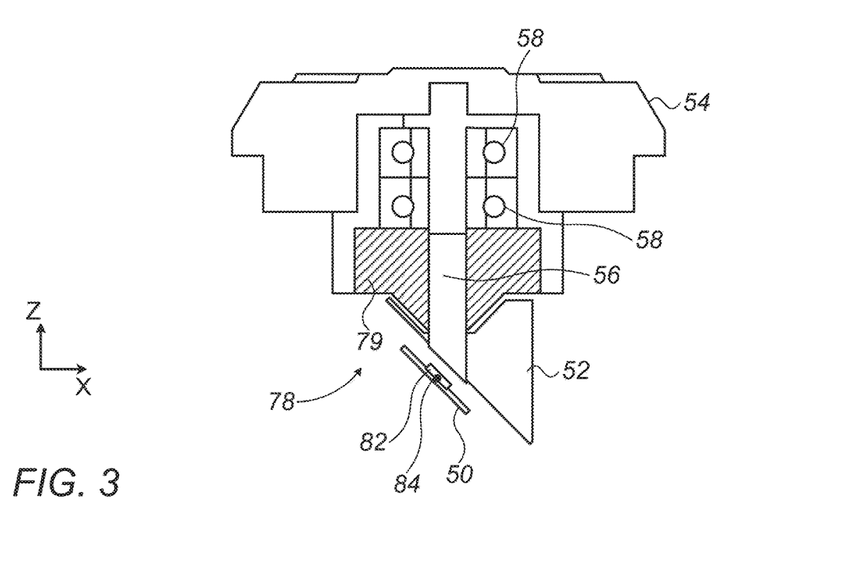
FIG. 3 is a schematic, sectional view of a scanning module used in the device of FIG. 1, in accordance with an embodiment of the invention.

Reference is now made to FIGS. 2A/B and 3, which schematically show internal details of device 20, in accordance with an embodiment of the invention. FIGS. 2A and 2B are sectional and pictorial views, respectively, of an optoelectronic assembly used in device 20, illustrating the mapping functionality and the (optional) projection functionality of the device. FIG. 3 is a sectional view showing details of scanning module 30.

In the pictured embodiment, scanning module 30 comprises a mirror assembly 60, comprising a rotating mirror 50, which is mounted on a gimbal 52. Base 22 contains one or more rotational bearings 58 defining a gimbal axis, which is parallel to the Z-axis as defined above. In the present case, bearings 58 are contained in a drive assembly 54, which is fixed within cap 28 of base 22. Gimbal 52 comprises a shaft 56, which fits into rotational bearings 58 and is configured to rotate through 360° of azimuth about the gimbal axis relative to base 22. Mirror assembly 60 is held by gimbal 52 on the gimbal axis, and is positioned so that mirror 50 rotates within mirror assembly 60 about a mirror axis 84 in the X-Y plane, perpendicular to the gimbal axis.

Drive assembly 54, which drives the rotations of gimbal 52 and mirror 50 about their respective axes, is contained in this example in cap 28 (FIG. 1), leaving free space for beam propagation below the mirror. These elements in the cap typically receive electrical drive power and control signals from circuits in the lower part of the base via thin wires or printed conductors running along the inner side of cylindrical window 26, which have little or no effect on the transmitted and received optical beams. Alternatively, other arrangements of these components are also possible.

A transmitter 40 directs pulses of optical radiation toward mirror 50, which directs the optical radiation through window 26 (FIG. 1) toward a scene. Transmitter 40 in this embodiment comprises an integrated photonics module (IPM), which comprises, for example, a laser diode, which emits very short (sub-nanosecond) pulses of infrared radiation, represented by arrows 44 in FIG. 2A. Alternatively, other types of transmitters may be used. A lens 42 collimates the beam emitted by transmitter 40. Mirror 50 scans the pulses over a scene, with a scan range represented by arrows 44a and 44b.

A receiver 66, such as an avalanche photodiode (APD), receives, via window 26, mirror 50, and collection optics 64, the optical radiation that is reflected from the scene, represented in FIG. 2A by arrows 62a, 62b and 62. Receiver 66 outputs signals indicative of respective times of flight of the pulses, i.e., the delay between transmission of each pulse by transmitter 40 and its arrival back at the receiver after reflection from the scene.

A transceiver module 32, comprising transmitter 40, receiver 66, and other, associated optical and electronic elements, is contained in pedestal 24 of base 22 (FIG. 1), below cylindrical window 26. To enable compact packaging of these elements, the transmitter and receiver, with their accompanying optics, are disposed in the X-Y plane.

Both the transmitted and received beams of radiation travel along the gimbal (Z) axis to and from mirror 50. The mirror in its rest position (as shown in the figures) reflects the transmitted beam out through window 26 in the X-Y plane, and likewise reflects in the received beam from the X-Y plane to receiver 66. Scanning mirror 50 about the mirror axis 84 causes the beams to scan above and below the X-Y plane. To enable this sort of optical arrangement, a beamsplitter 48 is positioned along the gimbal axis between transmitter 40 and receiver 66 and is configured so that the outgoing optical radiation is directed from transmitter 40, via beamsplitter 48, along the gimbal axis toward mirror 50, while the optical radiation reflected from the scene is directed, via beamsplitter 48, along the gimbal axis toward receiver 66. Assuming that the laser diode in the IPM emits polarized radiation, it is desirable that beamsplitter 48 be a polarizing beamsplitter (PBS). In the pictured embodiment, a folding mirror 46 turns the transmitted beam from the X- to the Z-direction for transmission through beamsplitter 48, while the reflected beam is turned from the Z- to the X-direction by the beamsplitter.

Control circuitry 34 drives gimbal 52 to rotate about the gimbal axis and mirror 50 to rotate about mirror axis in accordance with a desired scan pattern. The transmitted beam and the field of view of receiver 66 are thus scanned over an area of the scene extending over 360° of azimuth about the gimbal axis and over a desired range of elevations. Control circuitry 34 processes the signals output by receiver 66 in order to generate a 3D map of the scanned area, with the depth value at each point in the scan derived from the time of flight measured by receiver 66 at that point. This map will generally cover a toroidal region surrounding mapping device 20. Alternatively, the control circuitry may limit the rotation of gimbal 52 and/or mirror 50 so that the 3D map covers a smaller region within the overall toroidal scan range.

In the pictured embodiment, in addition to the short infrared pulses emitted by transmitter 40, also comprises a visible light emitter 68, which directs a visible light beam toward mirror 50, as illustrated by arrows 70, 70a, 70b in FIG. 2B. For example, visible light emitter 68 may comprise red, green and blue LEDs, which are modulated and combined in order to vary the color and intensity of the combined beam. A beamsplitter 45, for example a dichroic beamsplitter cube, combines the transmitted visible and infrared beams so that both beams pass along the gimbal axis to mirror 50, which thus projects a visible image onto the scene together with the infrared pulses. In other embodiments, this visible light projection function is absent, so that the device performs only 3D mapping.

Control circuitry 34 comprises a drive circuit, which drives mirror 50 to rotate about mirror axis 84 at one frequency, while driving gimbal 52 to rotate about the gimbal axis at a second frequency, which is typically lower than the mirror frequency. The mirror axis is therefore referred to as the "fast axis," while the gimbal axis is referred to as the "slow axis." In the pictured embodiment, mirror assembly 60 is produced as a micro-electro-mechanical system (MEMS) device, comprising a support, which is fixed to the gimbal, and hinges (not shown), extending between the mirror and support. In such devices, the hinges typically comprise torsion hinges, oriented along the mirror axis. The hinges and other aspects of the MEMS device can be designed so that mirror 50 rotates about the hinges at a resonant frequency of rotation of the mirror about the hinges. The slower rotation of gimbal shaft 56 within bearings 58, on the other hand, can be driven by any suitable sort of motor having sufficient precision, such as a magnetic or electromechanical drive.

Figure 4:
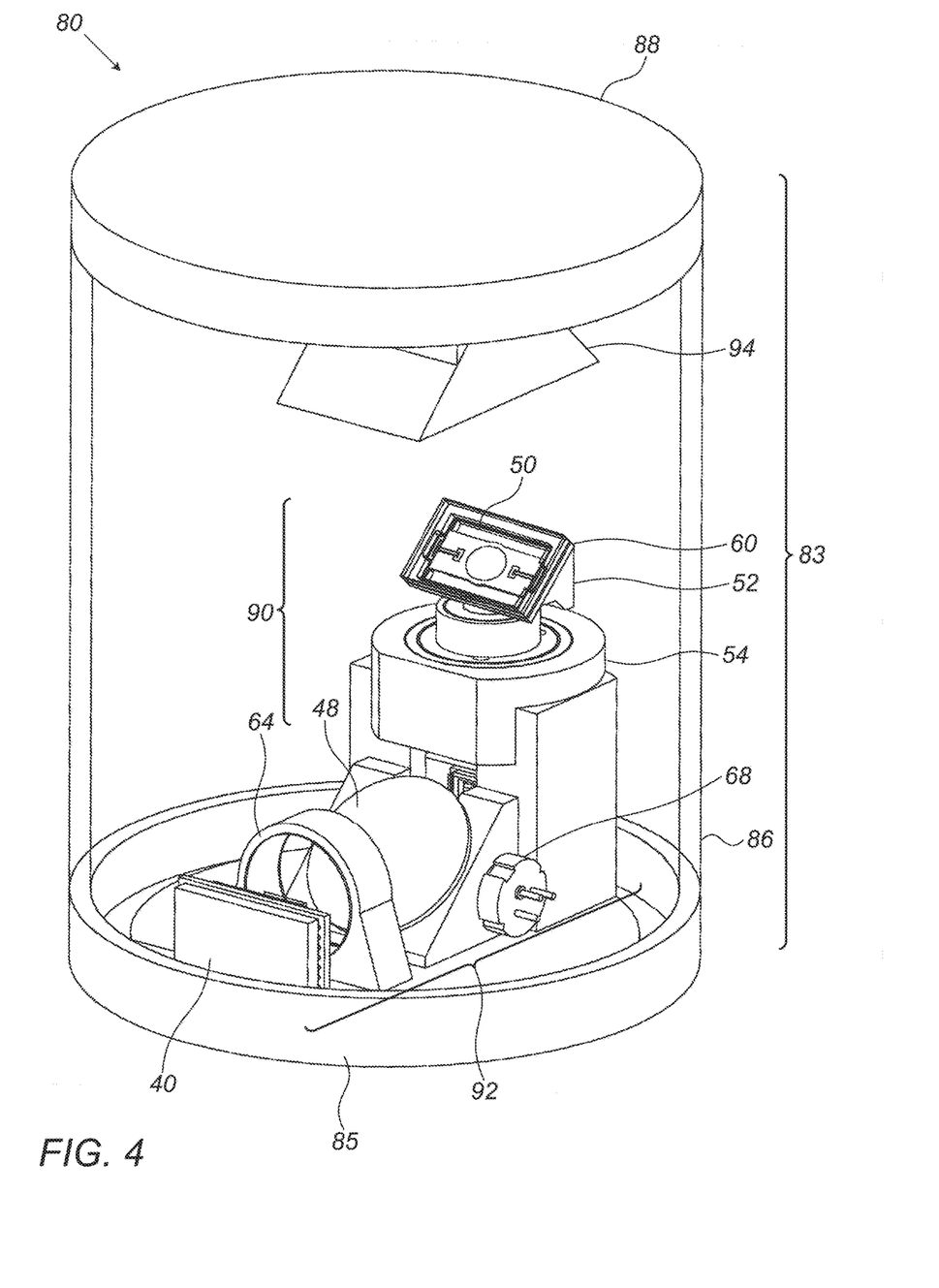
FIG. 4 is a schematic pictorial illustration of a 3D mapping and projection device, in accordance with another embodiment of the invention.

The MEMS mirror can be driven to rotate about the mirror axis by any suitable sort of compact drive, such as an electrostatic or an electromagnetic drive. FIG. 4 shows the latter option, using a stator 78 that is fixed to gimbal 52 and comprises a magnetic core. In the pictured example, shaft 56 of gimbal 52 forms a part of the stator core, including the lower end of the shaft, which is positioned in proximity to mirror 50. A stationary support, which is connected to the gimbal and in which the mirror is mounted, is shown as a part of mirror assembly 60 in FIGS. 2A/B. This support is omitted from FIG. 4, however, to show the location and range of motion of mirror 50 itself. Although mirror assembly 60 in the figures is unencapsulated, so that mirror 50 rotates in the ambient atmosphere within base 22, the mirror may alternatively be encapsulated in its own protective transparent envelope (not shown).

The core of stator 78 is wound with a conductive wire coil 79, which is driven by control circuitry 34 with a time-varying electrical current so as to generate a time-varying magnetic field at mirror 50. The rotor of the electromagnetic drive comprises one or more permanent magnets 82, which are fixed to mirror 50. The lines of flux of the magnetic field pass from gimbal shaft 56 through permanent magnet or magnets 82. The field thus exerts a time-varying force on the rotor, causing mirror 50 to rotate at the frequency of alternation of the magnetic field. As noted earlier, this frequency may advantageously be set to be equal or close to the resonant frequency of the rotation of the mirror on its hinges.

Figure 5:
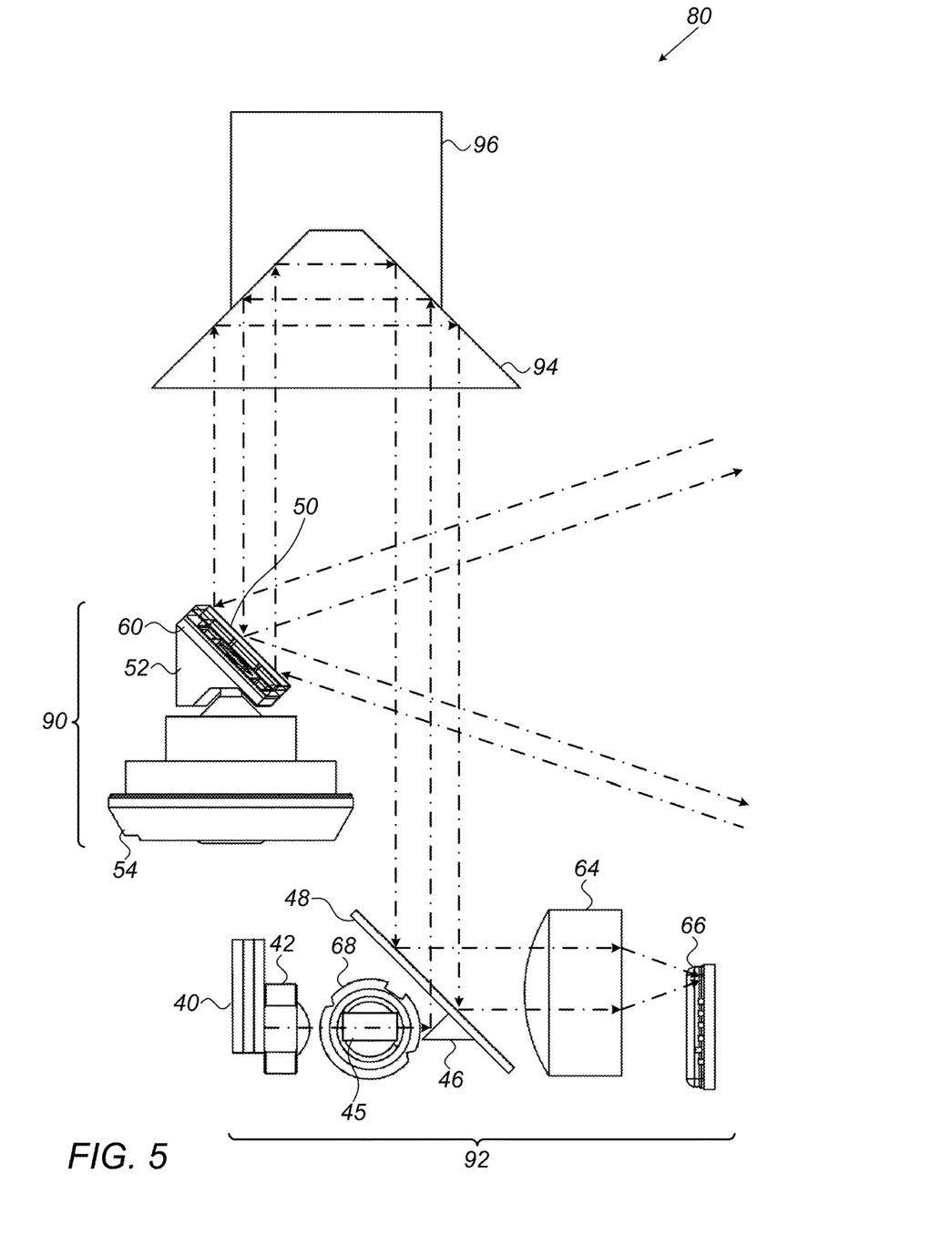
FIGS. 5 is a schematic sectional view of an optoelectronic assembly used in the device of FIG. 4, in accordance with an embodiment of the invention.

Reference is now made to FIGS. 4 and 5, which schematically illustrate a 3D mapping and projection device 80, in accordance with another embodiment of the invention. FIG. 4 is a pictorial view of device 80, which FIG. 5 is a sectional view of an optoelectronic assembly used in device 80. With certain exceptions which are explained hereinbelow, the structure and principles of operation of device 80 are similar to those of device 20, as described above. Elements of device 80 that are labeled with the same numbers as corresponding elements of device 20 can be assumed to operate in a similar manner and for the sake of brevity will not be described again below.

As in the preceding embodiment, device 80 comprises a base 83, comprising a pedestal 85 and a cap 88, with a cylindrical window 86 fixed between the base and the cap. In device 80, however, both a transceiver module 92 and a scanning module 90 (including rotational bearings 58, drive assembly 54, and gimbal 52) are mounted on pedestal 85. This configuration is advantageous, relative to device 20, in that no electrical connections are needed between pedestal 85 and cap 88, and thus window 86 can be completely clear.

In order to maintain the full 360° clear field of view in device 80, a retroreflector 94, such as a corner prism, is mounted in cap 88. As can be seen in FIG. 5, retroreflector 94 reflects the pulses of optical radiation that are emitted by transmitter 40 (via folding mirror 46) toward rotating mirror 50, which directs the pulses toward the scene that is to be mapped. Similarly, the optical radiation reflected from the scene via mirror 50 is reflected by retroreflector 94 via beamsplitter 48 toward receiver 66.

Although in the embodiments described above, device 20 is configured for depth mapping based on measuring time of flight, the principles of the present invention may alternatively be applied in conjunction with other sorts of depth mapping techniques, such as pattern-based depth mapping. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Scanning apparatus, comprising:
   a base, comprising a pedestal and a cap, and containing one or more rotational bearings fixed within the pedestal and containing one or more rotational bearings disposed along a gimbal axis;
   a gimbal, comprising a shaft that fits into the rotational bearings and is configured to rotate through 360° of azimuth about the gimbal axis relative to the base;
   a mirror assembly, which is fixed to the gimbal and comprises a mirror, which is positioned on the gimbal axis and is configured to rotate within the mirror assembly about a mirror axis perpendicular to the gimbal axis;
   a transmitter, which is configured to direct pulses of optical radiation toward the mirror, which directs the optical radiation toward a scene;
   a receiver, which is positioned to receive, via the mirror, the optical radiation reflected from the scene and to output signals in response to the received radiation,
   wherein the gimbal, the mirror assembly, the transmitter and the receiver are contained inside the base, and wherein the base comprises a cylindrical window, which is fixed between the pedestal and the cap and surrounds the mirror assembly, through which the optical radiation exits and enters the base;
   a retroreflector, which is mounted in the cap so as to reflect the pulses of optical radiation from the transmitter toward the mirror, and to reflect the optical radiation reflected from the scene via the mirror toward the receiver; and
   control circuitry, which is configured to drive the gimbal to rotate about the gimbal axis and the mirror to rotate about the mirror axis so as to scan the optical radiation over an area of the scene extending over the 360° of azimuth about the gimbal axis, and to process the signals output by the receiver in order to generate a three-dimensional map of the scanned area.

2. The apparatus according to claim 1, and comprising a beamsplitter, which is positioned along the gimbal axis between the transmitter and the receiver and is configured so that the optical radiation is directed from the transmitter, via the beamsplitter, along the gimbal axis toward the mirror, while the optical radiation reflected from the scene is directed, via the beamsplitter, along the gimbal axis toward the receiver.

3. The apparatus according to claim 1, wherein the pulses of the optical radiation comprise infrared radiation, and wherein the apparatus comprises an emitter, which is configured to direct a visible light beam toward the mirror, wherein the visible light beam is modulated so as to project a visible image via the mirror onto the scene.

4. The apparatus according to claim 1, wherein the base is configured for placement on a flat surface, with the gimbal axis perpendicular to the flat surface.

5. The apparatus according to claim 1, wherein the control circuitry comprises a drive, which is coupled to the mirror assembly and the gimbal so as to cause the mirror to rotate about the mirror axis at a first frequency, while causing the gimbal to rotate about the gimbal axis at a second frequency, which is lower than the first frequency.

6. The apparatus according to claim 5, wherein the mirror assembly comprises a support, which is fixed to the gimbal, and hinges, extending between the mirror and support, wherein the first frequency is a resonant frequency of rotation of the mirror about the hinges.

7. The apparatus according to claim 5, wherein the drive is an electromagnetic drive, which comprises:
   a stator, which is fixed to the gimbal and comprises a core positioned in proximity to the mirror and conductive wire wound on the core and driven with an electrical current by the control circuitry so as to cause the core to generate a magnetic field at the mirror; and
   a rotor, comprising one or more permanent magnets, which are fixed to the mirror are positioned so as to rotate in response to the magnetic field.

8. The apparatus according to claim 7, wherein the stator comprises at least a part of the shaft of the gimbal.

9. The apparatus according to claim 1, wherein the signals output by the receiver are indicative of respective times of flights of the pulses, and wherein the control circuitry is configured to generate the three-dimensional map based on the times of flight.

10. A method for scanning, comprising:
    providing a base, comprising a pedestal and a cap, and containing one or more rotational bearings disposed along a gimbal axis;
    fitting a shaft of a gimbal into the rotational bearings so that the gimbal is able to rotate through 360° of azimuth about the gimbal axis relative to the base;
    fixing a mirror assembly, comprising a mirror, to the gimbal so that the mirror is positioned on the gimbal axis and is configured to rotate within the mirror assembly about a mirror axis perpendicular to the gimbal axis,
    wherein the gimbal, the mirror assembly, a transmitter and a receiver are contained inside the base, and wherein the base comprises a cylindrical window, which is fixed between the pedestal and the cap and surrounds the mirror assembly, through which optical radiation exits and enters the base;

directing pulses of optical radiation from a transmitter toward the mirror, which directs the optical radiation toward a scene;

receiving, via the mirror, the optical radiation reflected from the scene in a receiver, which outputs signals in response to the received radiation;

mounting a retroreflector in the cap so as to reflect the pulses of optical radiation from the transmitter toward the mirror, and to reflect the optical radiation reflected from the scene via the mirror toward the receiver;

driving the gimbal to rotate about the gimbal axis and the mirror to rotate about the mirror axis so as to scan the optical radiation over an area of the scene extending over the 360° of azimuth about the gimbal axis; and processing the signals output by the receiver in order to generate a three-dimensional map of the scanned area.

11. The method according to claim 10, and comprising positioning a beamsplitter along the gimbal axis between the transmitter and the receiver so that the optical radiation is directed from the transmitter, via the beamsplitter, along the gimbal axis toward the mirror, while the optical radiation reflected from the scene is directed, via the beamsplitter, along the gimbal axis toward the receiver.

12. The method according to claim 10, wherein the pulses of the optical radiation comprise infrared radiation, and wherein the method comprises directing a visible light beam toward the mirror, wherein the visible light beam is modulated so as to project a visible image via the mirror onto the scene.

13. The method according to claim 10, wherein the base is configured for placement on a flat surface, with the gimbal axis perpendicular to the flat surface.

14. The method according to claim 10, wherein the signals output by the receiver are indicative of respective times of flights of the pulses, and wherein processing the signals comprises generating the three-dimension map based on the times of flight.

* * * * *